US011398010B2

(12) United States Patent
Yadav et al.

(10) Patent No.: US 11,398,010 B2
(45) Date of Patent: *Jul. 26, 2022

(54) GENERATING A DIGITAL COLLAGE USING DIGITAL IMAGES

(71) Applicant: Adobe Inc., San Jose, CA (US)

(72) Inventors: Nitesh Yadav, New Delhi (IN); Sameer Bhatt, Noida (IN); Pulkit Jindal, Rohini (IN)

(73) Assignee: Adobe Inc., San Jose, CA (US)

( * ) Notice: Subject to any disclaimer, the term of this patent is extended or adjusted under 35 U.S.C. 154(b) by 133 days.

This patent is subject to a terminal disclaimer.

(21) Appl. No.: 17/037,058

(22) Filed: Sep. 29, 2020

(65) Prior Publication Data

US 2021/0012461 A1 Jan. 14, 2021

Related U.S. Application Data

(63) Continuation of application No. 16/183,381, filed on Nov. 7, 2018, now Pat. No. 10,878,535.

(51) Int. Cl.
*G06T 3/40* (2006.01)
(52) U.S. Cl.
CPC .................. *G06T 3/4038* (2013.01)
(58) Field of Classification Search
CPC .............................. G06T 11/60; G06T 3/4038
See application file for complete search history.

(56) References Cited

U.S. PATENT DOCUMENTS

| 10,878,535 | B2 | 12/2020 | Yadav et al. |
| 2018/0174340 | A1* | 6/2018 | Shah ...................... G06T 11/60 |
| 2020/0143514 | A1 | 5/2020 | Yadav et al. |

OTHER PUBLICATIONS

"Notice of Allowance", U.S. Appl. No. 16/183,381, filed Sep. 23, 2020, 18 pages.

* cited by examiner

*Primary Examiner* — Manuchehr Rahmjoo
(74) *Attorney, Agent, or Firm* — FIG. 1 Patents

(57) ABSTRACT

Techniques for generating a digital collage using digital images are described. An image editing system obtains a set of digital images and a collage template to be used for generating a digital collage. The image editing system calculates different arrangement permutations for placing the digital images into digital frames of the collage template, and identifies a region of interest in each of the digital images. The image editing system fits the digital images into the digital frames for each of the arrangement permutations, and calculates a permutation error value for each arrangement permutation based on proportions of the regions of interest for each of the digital images that fit into respective digital frames. The image editing system selects an arrangement permutation with an optimal permutation error value, and uses the selected arrangement permutation to arrange the set of digital images in the collage template to generate the digital collage.

20 Claims, 14 Drawing Sheets

700 

702
Obtain a set of digital images and a collage template that is usable for generating a digital collage using the set of digital images, the selected collage template including an arrangement of digital frames

704
Generate different arrangement permutations that each represent a different arrangement for placing the set of digital images into the arrangement of digital frames

706
Detect a region of interest in each digital image of the set of digital images

708
Assign a permutation error value for each permutation based on, for each arrangement permutation, fitting the region of interest for each digital image into a respective frame and determining the permutation error value based on the proportions of each digital image that fit into a respective digital frame

710
Generate the digital collage by placing the set of digital images into the collage template according to the arrangement permutation with an optimal permutation error value

*Fig. 7*

GENERATING A DIGITAL COLLAGE USING DIGITAL IMAGES

RELATED APPLICATION

This application is a divisional of and claims priority to U.S. patent application Ser. No. 16/183,381, filed 7 Nov. 2018 and titled "Generating a Digital Collage using Digital Images," the entire contents of which are incorporated by reference in their entirety herein.

BACKGROUND

Image editing systems provide a variety of different functionalities for visually transforming digital images in various ways. For instance, a typical image editing system enables a user to apply different editing operations to a digital image, such as image resizing, image cropping, color transformations, visual object extraction and replacement, and so forth. One particularly popular image editing functionality is the ability to combine multiple digital images into a composite image, often referred to as a collage.

Conventional image editing systems that provide collage functionality typically enable a user to select a set of digital images for a collage, after which the image editing system places the set of digital images into a particular visual format to generate a collage. These conventional systems, however, do not take into account that digital images are not uniform in their subject matter and composition. For instance, some conventional systems simply start with a predefined collage format and arrange a set of digital images into the format based on the size of each digital image. Each digital image, for instance, is resized and/or cropped to enable the set of digital images to fit into the predefined collage format. However, since digital images are not typically uniform in their subject matter and composition, placing a set of digital images according to a predefined format to generate a collage without consideration of the subject matter and arrangement of each digital image may provide a less than optimal placement and layout of the digital images.

For example, a digital image often has a region of interest that represents a visual focal point within the digital image. Consider, for instance, a digital photo of a person in an outdoor setting and that the person's face represents a region of interest within the digital photo. To generate a collage that includes the digital photo, a conventional image editing system would typically process and place the digital photo into the collage based on the aggregate content of the digital photo, without considering the position and size of the person's face relative to the digital photo as a whole. This conventional placement technique may result in a visually off-putting arrangement, such as if the person's face is partially or wholly obscured by another digital image in the collage.

To attempt to mitigate such a scenario, user's that interact with conventional image editing systems may manually manipulate digital images to attempt to arrive at an optimal arrangement of digital images within a collage. For instance, a user can interact with an image editing interface of a conventional image editing system to move individual digital images within a predefined collage format to attempt to find a visually pleasing arrangement of the digital images. Further, a user can manually transform the digital images via interaction with the conventional image editing interface, such as through cropping and resizing, to endeavor to fit the digital images into a visual arrangement that the user finds visually satisfactory. However, there are a multitude of different ways that a set of digital images can be moved, resized, cropped, and so forth, to place the digital images within a collage. This results in very large sets of possible visual arrangements that greatly reduce the likelihood that a user will manually generate a visual arrangement that presents each digital image of a set of digital images in an optimal position within a collage. Further, such manual interactions with conventional image editing interfaces are extremely time consuming and require users to manually and individually select multiple different editing controls in repetitive processes in an attempt to arrive at a visual optimal arrangement of digital images in a collage.

Thus, conventional image editing systems that provide collage functionality typically fail to account for variations in digital image composition when placing digital images in a collage. Further, such conventional systems provide interfaces that are difficult and inefficient for a user to navigate when attempting to manually transform and arrange digital images to generate a collage. These drawbacks significantly reduce the likelihood that a visually optimal arrangement of digital images will be identified, particularly in scenarios that involve a collage with numerous digital images.

SUMMARY

To overcome these problems, techniques for generating a digital collage using digital images are delivered in a digital medium environment. An image editing system obtains a set of digital images to be used to generate a digital collage, and identifies a collage template to be used for generating the digital collage using the digital images. The image editing system calculates different arrangement permutations that represent different ways for placing the digital images into digital frames of the collage template, and identifies a region of interest in each of the digital images. The image editing system fits the digital images into the digital frames of the collage template for each of the arrangement permutations, and calculates a permutation error value for each arrangement permutation based on proportions of the regions of interest for each of the digital images that fit into respective digital frames. The image editing system selects an arrangement permutation with an optimal permutation error value, and uses the selected arrangement permutation to arrange the set of digital images in the collage template to generate the digital collage.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

FIG. 7 depicts an example procedure for generating a digital collage using digital images.

DETAILED DESCRIPTION

Overview

Figure 1:
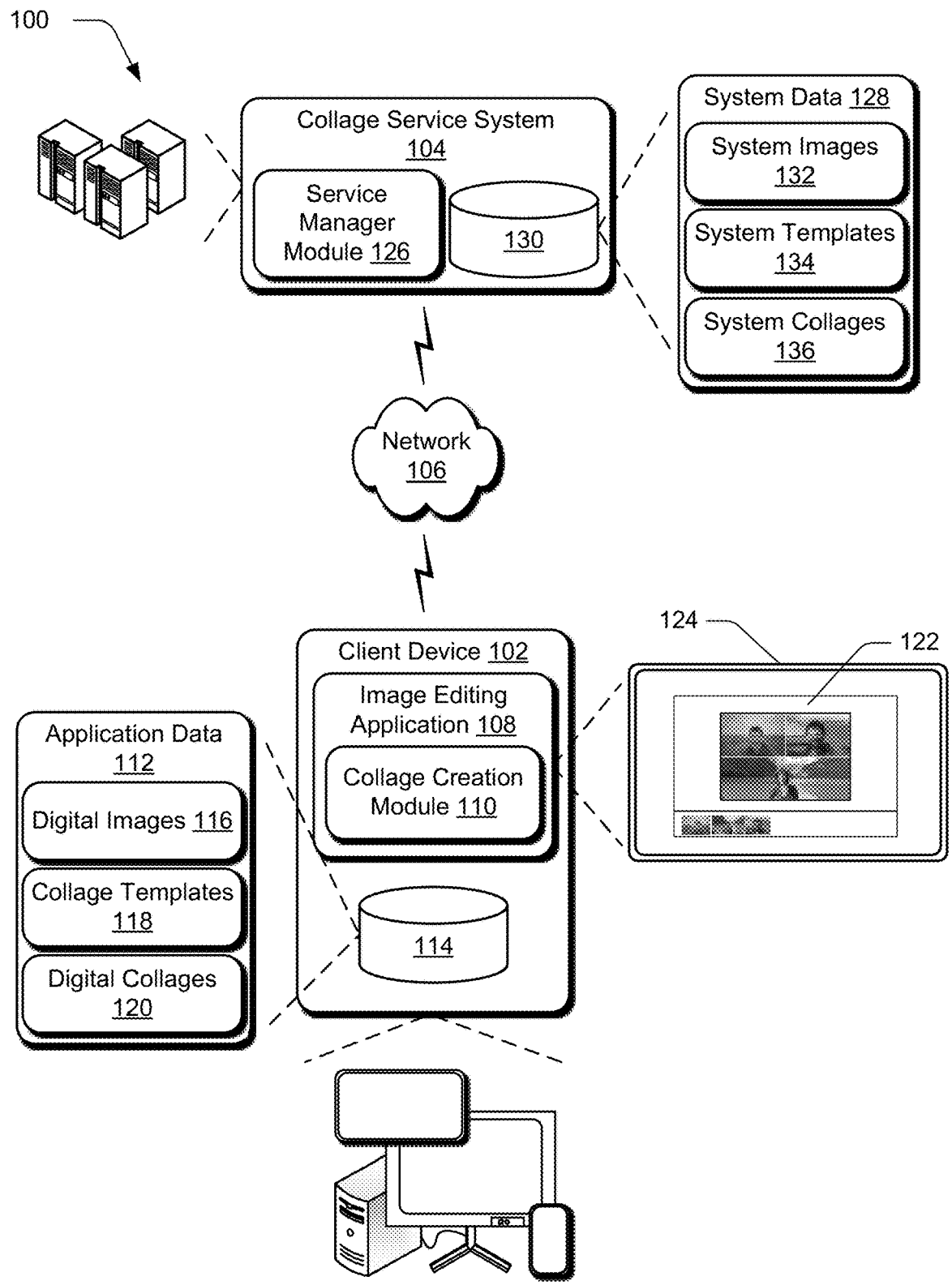
FIG. 1 is an illustration of an environment in an example implementation that is operable to employ techniques described herein.

Conventional image editing systems that provide collage functionality typically enable a user to select a set of digital images for a collage, after which the image editing system places the set of digital images into a particular visual format to generate a collage. These conventional systems, however, do not take into account that digital images are not uniform in their subject matter and image composition. For instance, a digital image often has a region of interest that represents a visual focal point within the digital image. To generate a collage that includes a digital image with a region of interest, a conventional image editing system would typically process and place the digital image into the collage based on the aggregate content of the digital photo, without considering the position and size of the region of interest relative to the digital image as a whole. This conventional placement technique may result in a visually off-putting arrangement, such as if the region of interest is partially or wholly obscured by another digital image in the collage.

To attempt to mitigate such a scenario, user's that interact with conventional image editing systems may manually manipulate digital images to attempt to arrive at an optimal arrangement of digital images within a collage. However, there are a multitude of different ways that a set of digital images can be manipulated (e.g., moved, resized, cropped, and so forth) to place the digital images within a collage. This results in very large sets of possible visual arrangements that greatly reduce the likelihood that a user will manually generate a visual arrangement that presents each digital image of a set of digital images in an optimal position within a collage. Further, conventional image editing systems provide interfaces that are difficult and inefficient for a user to navigate when attempting to manually transform and arrange digital images to generate a collage. These drawbacks significantly increase the burden on users and reduce the likelihood that a visually optimal arrangement of digital images will be identified, particularly in scenarios that involve a collage with numerous digital images.

To overcome these drawbacks with conventional image editing systems, techniques for generating a digital collage using digital images are implemented in a digital medium environment. An image editing system obtains a set of digital images to be used to generate a digital collage. A user, for instance, selects the set of digital images and provides an instruction to the image editing system to generate a digital collage using the digital images. Accordingly, the image editing system identifies a collage template to be used for generating a digital collage using the digital images, and the collage template includes a set of digital frames into which the digital images are placeable. In an implementation, the image editing system selects the collage template such that the number of digital frames corresponds to the number of digital images, and each digital image is placeable into a different respective digital frame.

Given the set of digital images and the collage template, the image editing system calculates different arrangement permutations of ways for placing the digital images into the digital frames of the collage template. Each arrangement permutation, for instance, represents a different way of arranging each digital image into the collage template such that each digital image is placed into a different respective digital frame. Thus, in an implementation where n digital images are placed into n digital frames on a one-to-one basis, a number of possible different arrangement permutations can be calculated as n!.

To enable the digital images to be fit into the collage template based on the different arrangement permutations, the image editing system processes the digital images to identify a region of interest in each digital image. A region of interest, for example, represents a focal point or set of focal points in a digital image, such as a human face, a natural feature, a geological feature, and so forth. The image editing system then performs an image fitting operation for each digital image by, for each arrangement permutation, placing each digital image into a respective digital frame such that the region of interest for each digital image is prioritized in positioning the digital image in a respective digital frame. By way of example, the image editing system places each digital image into a respective digital frame such that the region of interest for each digital image is centered within the respective digital frame.

In some implementations, and particularly where the region of interest is not located in the center of a digital image and/or where the aspect ratio of a digital image is different than that of a corresponding digital frame, centering the region of interest of a digital image within a digital frame may result in empty spaces within the digital frame that are not filled by portions of the digital image. Accordingly, the image editing system may resize and move a digital image within a digital frame such that the entire digital frame is filled with the digital image, and the region of interest of the digital image is positioned at or near the center of the digital frame.

With the digital images fit within the collage template for each of the arrangement permutations, the image editing system calculates permutation error values for each arrangement permutation. Each permutation error value generally indicates "how well" the digital images fit into the respective digital frames for each arrangement permutation. For instance, for a particular arrangement permutation, the image editing system processes the individual digital images to determine a relative proportion of the regions of interest for each digital image that fits into a respective digital frame to determine an image error value for each digital image. Generally, the higher a proportion of a region of interest of a digital image that fits into a respective digital frame, the more optimal its image error value. This reflects the notion that it is visually preferable to maximize an amount of a region of interest that is visible within a digital frame.

Accordingly, the image editing system aggregates the image error values for each arrangement permutation to generate a permutation error value for each arrangement permutation. By way of example, for each arrangement permutation, the image editing system sums the image error values for individual digital images placed in corresponding digital frames of the arrangement permutation to generate a permutation error value for the arrangement permutation. Accordingly, the image editing system can sort the arrangement permutations based on their permutation error values to identify those arrangement permutations with the most optimal (e.g., lowest) permutation error values.

To generate a digital collage using the set of digital images and based on the selected collage template, the image editing system selects an arrangement permutation with the most optimal permutation error value, e.g., the arrangement permutation with the lowest permutation error value. The image editing system then generates the digital collage by placing the set of digital images into the collage template according to the selected arrangement permutation, and visually displays the digital collage. By selecting the arrangement permutation with the most optimal permutation error value, the image editing system increases the likelihood that the visual appearance of the regions of interest for the set of digital images will be preserved in the digital collage. That is, that the selected arrangement permutation represents an arrangement of the digital images within the collage template that provides a best fit of the regions of interest for the set of digital images, in comparison with other arrangement permutations of the collage template.

In this way, techniques for generating a digital collage using digital images provide automated processes for selecting appropriate collage templates for generating a digital collage using a set of digital images, and for optimizing visual placement of the digital images within a particular collage template. Consequently, the disclosed techniques are usable generate digital collages that preserve, to the extend possible, the integrity of regions of interest within constituent digital images. Since the described techniques fit digital images by considering regions of interest and not just digital images as a whole, the techniques can generate digital collages using non-standard frame shapes and arrangements. Further, by automatically processing and fitting digital images into collage templates, the disclosed techniques greatly reduce the number of user interactions required to generate a digital collage, thus conserving system resources and providing a more efficient image editing interface experience.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques for generating a digital collage using digital images described herein. The illustrated environment 100 includes a client device 102 and a collage service system 104 that are communicatively coupled, one to another, via a network 106.

Computing devices that are usable to implement the client device 102 and the collage service system 104 may be configured in a variety of ways, such as a desktop computer, a laptop computer, a mobile device (e.g., assuming a hand-held configuration such as a tablet or mobile phone), a server device, and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 14.

The client device 102 includes an image editing application 108 that is representative of functionality to perform various editing interactions with digital images, such as various types of image transformations. The image editing application 108, for instance, includes a collage creation module 110 that is representative of functionality to arrange sets of digital images into composite digital images, referred to herein as a "digital collage." A digital collage, for instance, represents an arrangement of multiple digital images into a particular pattern, such as a predefined layout. To enable the collage creation module 110 to create different collages, the image editing application 108 maintains application data 112 stored on a local storage 114. The application data 112 includes digital images 116 and collage templates 118 that are usable by the collage creation module 110 to generate digital collages 120.

The digital images 116 are generally representative of different images that are stored in digital form, such as raster images, bitmap images, vector images, and so forth. In a typical, non-limiting implementation, the digital images 116 represent photographs that are captured in digital form by a digital camera, or that are converted into digital form. The collage templates 118 represent data that describes different ways for arranging different sets of the digital images 116. For instance, the collage templates 118 include different arrangements of "frames" into which sets of the digital images 116 can be placed to create the digital collages 120. Accordingly, the digital collages 120 represents different composite digital images that are generated by arranging sets of the digital images 116 according to different collage templates 118.

To enable users to interact with the image editing application 108, such as to create instances of the digital collages 120, the image editing application 108 includes an image editing graphical user interface ("GUI") 122 displayed on display device 124 of the client device 102. The image editing GUI 122 is representative of functionality to present various visual affordances for interacting with the image editing application 108. The image editing GUI 122, for example, is configured to receive user input to invoke various actions by the image editing application 108. For instance, a user may provide input to the image editing GUI 122 to select a set of digital images 116 and to select a collage template 118 to cause an instance of a digital collage 120 to be generated.

In at least some implementations, certain image editing actions of the image editing application 108 can be performed in part or wholly by the collage service system 104. The collage service system 104, for example, represents a network-based service that can assist the client device 102 in performing various image editing actions via the image editing application 108. To enable the collage service system 104 to perform such actions, the collage service system 104 maintains a service manager module 126, which is representative of functionality for performing actions as part of techniques for generating a digital collage using digital images described herein. Examples of such actions include different data processing and storage tasks that can be performed by the collage service system 104.

For instance, additionally or alternatively to storing the application data 112 locally on the client device 102, the collage service system 104 stores system data 128 on a system storage 130. The system data 128 system digital images ("system images") 132, system collage templates ("system templates") 134, and system digital collages ("system collages") 136. A user, for example, can access the collage service system 104 via the image editing application 108 on the client device 102 to enable the user to create digital collages via the collage service system 104. Thus, digital collages may be created locally on the client device 102, via interaction with the collage service system 104, and/or cooperatively via distribution of tasks between the client device 102 and the collage service system 104. Thus, although certain implementations are discussed herein with reference to instances of the digital images 116, the collage templates 118, and the digital collages 120, such implementations may also apply to the system images 132, the system templates 134, and the system collages 136, respectively.

Having considered an example environment, consider now a discussion of some example details of the techniques for generating a digital collage using digital images in accordance with one or more implementations.

Generating a Digital Collage Using Digital Images

Figure 2:
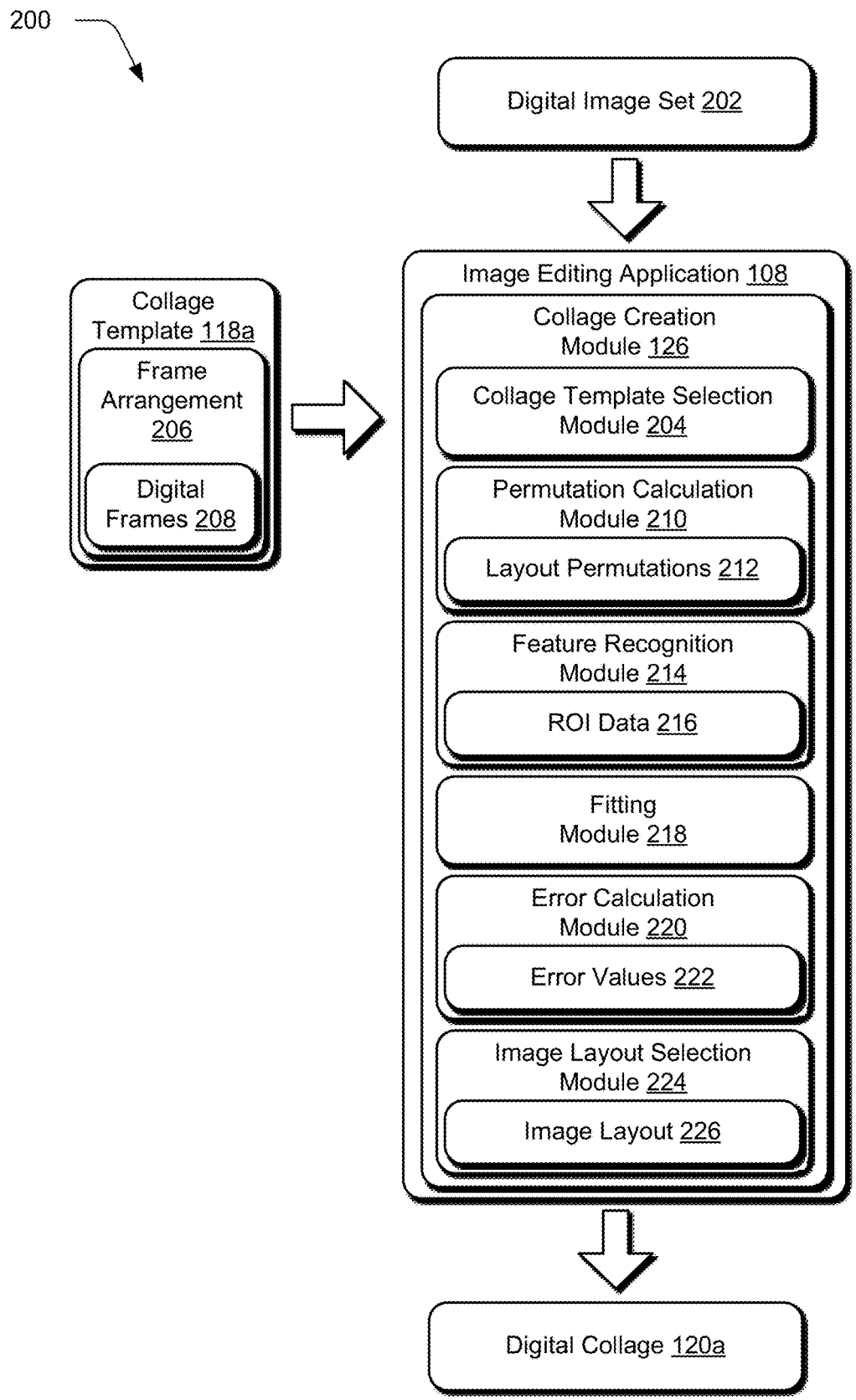
FIG. 2 depicts an example implementation in which a digital collage system generates a digital collage using a set of digital images.

FIG. 2 depicts portions of an image editing system 200 in an example implementation in which the image editing application 108 generates a digital collage 120a utilizing techniques for generating a digital collage using digital images described herein. In the system 200, the image editing application 108 takes a digital image set 202 as input. A user, for instance, interacts with the image editing GUI 122 to select images from the digital images 116, which are aggregated as the digital image set 202. Further, a collage template selection module 204 selects a collage template 118a for arranging the digital image set 202. In at least one implementation, a user selects the collage template 118a from a group of available collage templates 118. Alternatively, the collage template selection module 204 automatically selects the collage template 118a, such as based on attributes of the digital image set 202. For example, the collage template selection module 204 can suggest and/or select the collage template 118a based on a number of images in the digital image set 202, a size of the digital images, a resolution of the digital images, subject matter represented in the digital images, and so forth.

The collage template 118 includes a frame arrangement 206, which represents a set of digital frames 208 (e.g., digital visual containers) into which the individual images of the digital image set 202 are placeable to generate the digital collage 120. In at least one implementation, the collage template 118a is selected such that a number of digital frames 208 in the frame arrangement 206 is equal to a number of images in the digital image set 202 such that each digital image can be placed in its own respective digital frame 208. This is not intended to be limiting, however, and other implementations are contemplated, such as placing multiple images into a single digital frame 208, distributing a single image across multiple digital frames 208, and so forth. Generally, the frame arrangement 206 represents data that specifies visual aspects of the digital frames 208 in the collage template 118a, such as a number, size, position, and so forth, of the digital frames 208.

Continuing, the collage creation module 110 leverages a permutation calculation module 210 to permute the digital image set 202 on the digital frames 208 to generate layout permutations 212. The permutation calculation module 210, for example, generates the layout permutations 212 as a number (e.g., a total number) of different ways in which the digital image set 202 can be placed into the digital frames 208. One example way for permuting the digital image set 202 over the digital frames 208 to generate the layout permutations 212 is described in detail below with reference to FIG. 9.

The collage creation module 110 then leverages a feature recognition module 214 to process the digital image set 202 and to identify regions of interest in the individual digital images of the digital image set 202, and to store data that describes the regions of interest as region on interest ("ROI") data 216. The feature recognition module 214, for instance, processes each of the digital images to identify specific instances of a particular predefined type of region of interest, such as human faces. The ROI data 216 describes the region(s) of interest for each digital image of the digital image set 202, such as a position, type, and/or size of the region of interest.

Further to the digital collage creation process, the collage creation module 126 implements a fitting module 218 to fit the digital image set 202 into each of the layout permutations 212 of the collage template 118a and utilizing the ROI data 216. For instance, for each layout permutation 212, the fitting module 218 positions the digital images from the digital image set 202 into the respective frames 208 and based on the image placement specified by the layout permutation 212. Further, the fitting module 218 places each digital image to maximize a proportion of a respective region of interest of the digital image that is visible within a respective digital frame 208, e.g., to minimize a proportion of the region of interest that is obscured by placing the digital image in the respective frame 208.

The collage creation module 110 then leverages an error calculation module 220 to calculate error values 222 that each correspond to an error value that results from placing the digital image set 202 into the digital frames 208 according to each of the layout permutations 212. For instance, for each digital image fit into a digital frame 208 by the fitting module 218, the error calculation module 220 calculates an individual error value 222 based on how well the region of interest of the digital image fits into the respective digital frame 208. Further, for each layout permutation 212, the error calculation module 220 determines an error value 222, such as by summing the individual image error values determined based on image fitting. In an implementation, the error calculation module 220 can also calculate error values 222 for different collage templates 118, such as based on error values of different layout permutations for the collage templates. Example ways for calculating the error values 222 described in detail below with reference to FIG. 11.

Continuing, the collage creation module 110 utilizes an image layout selection module 224 to select an image layout 226 for generating the digital collage 120a and based on the error values 222. For instance, a layout permutation 212 with a lowest error value 222 is selected as the image layout 226. The image layout 226 generally represents data that maps individual images of the digital image set 202 to individual frames 208 of the frame arrangement 206. Accordingly, the collage creation module 110 generates the digital collage 120a by placing the images of the digital image set 202 into the frames 208 according to the image layout 226. Having discussed an example system overview for generating a digital collage, consider now some example implementation scenarios and procedures for generating a digital collage using digital images.

Figure 3:
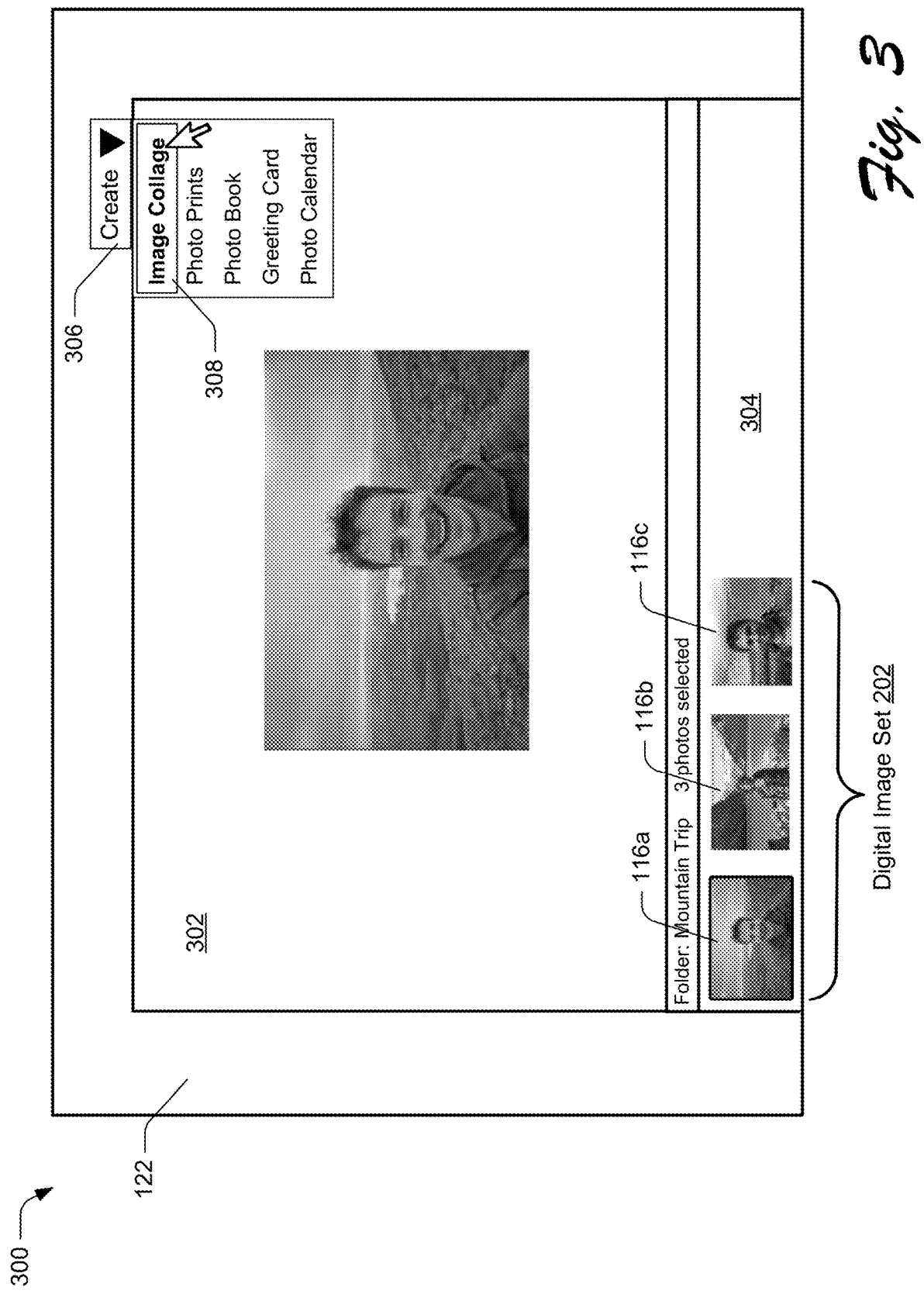
FIG. 3 depicts an example implementation scenario for initiating a process for generating a digital collage.

FIG. 3 depicts an example implementation scenario 300 for initiating a process for generating a digital collage. The scenario 300 includes the image editing GUI 122 for the image editing application 108, introduced above. This implementation of the image editing GUI 122 includes a working canvas 302 and an image queue 304. The working canvas 302 represents a region of the image editing GUI 122 in which an image editing project can be displayed. For instance, an image or set of images to be edited can be displayed in the working canvas 302, and various editing actions can be applied to the image(s) within the working canvas 302. The image queue 304 represents a region of the image editing GUI 122 which can be populated with images that are candidates for editing within the working canvas 302. For instance, when a user wishes to participate in an image editing project, the user can populate digital images to the image queue 304. To then perform an editing action on a particular image or set of images from the image queue 304, the user can move the image(s) from the image queue 304 to the working canvas 302. Alternatively or additionally, and as is the case with at least some techniques for generating a digital collage using digital images, a selected editing action can be automatically applied by the image editing application 108 to images within the image queue 304.

In the scenario 300, a user selects the digital image set 202, which in this example includes 3 digital images: A digital image 116a, a digital image 116b, and a digital image 116c, which represent different instances of the digital images 116. In an implementation, a user selects the digital image set 202 from the digital images 116 via input that instructs the image editing application 108 to place the digital image set 202 into the image queue 304 of the image editing GUI 122 for further processing. The user then navigates to an action menu 306, which presents a number of available options for image editing using the digital image set 202. From the action menu 306, the user selects a create collage option 308, which causes a digital collage creation process to be initiated by the image editing application 108.

Figure 4:
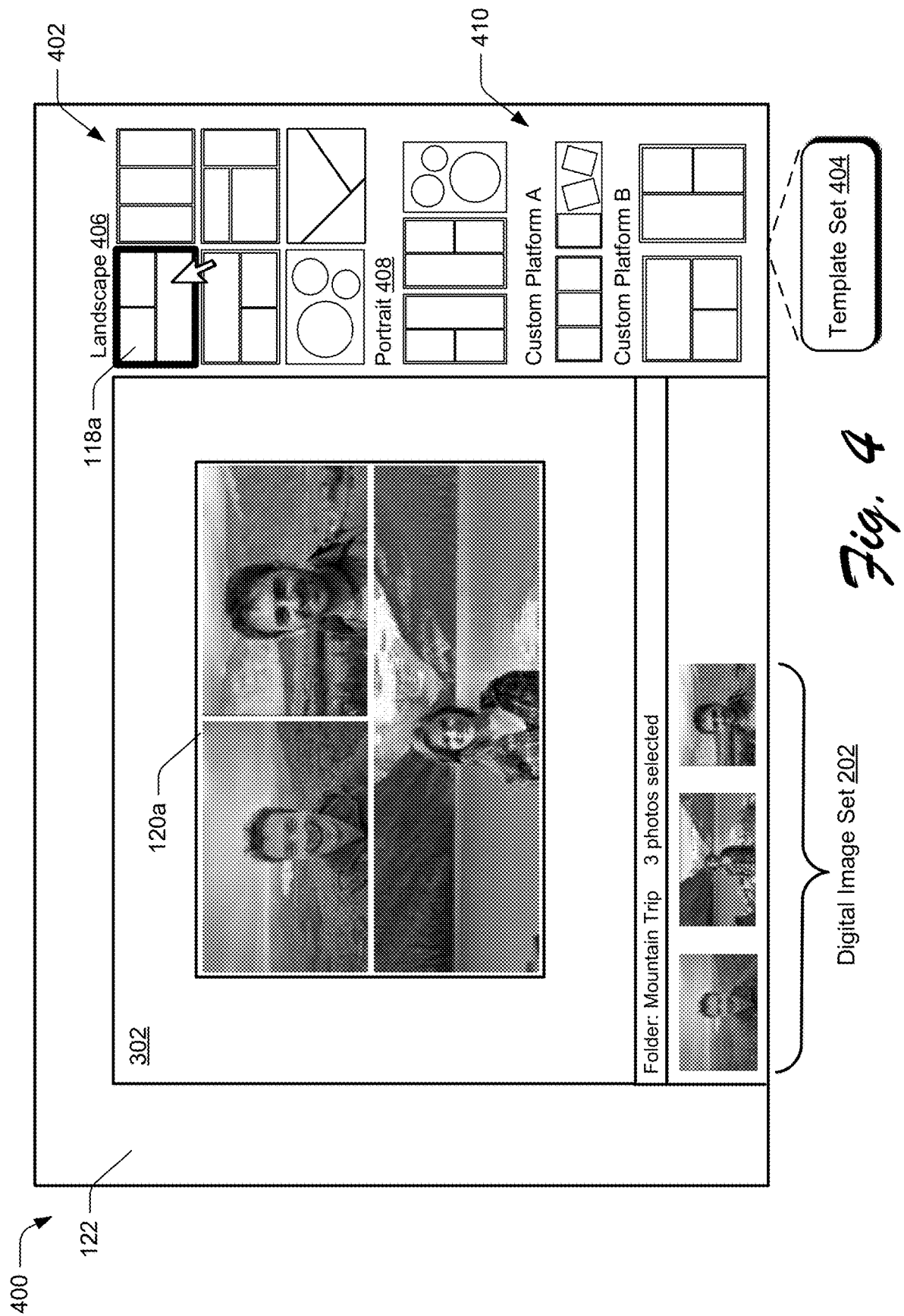
FIG. 4 depicts an example implementation scenario for selecting a collage template for generating a digital collage.

FIG. 4 depicts an example implementation scenario 400 for selecting a collage template for generating a digital collage. The scenario 400, for instance, represents a continuation of the scenario 300, above. In the scenario 400, and in response to selection of the create collage option 308 from the action menu 306, a template menu 402 is presented in the image editing GUI 122. The template menu 402 includes a template set 404 that represents instances of the collage templates 118 that can be applied to generate different digital collages using the digital image set 202. The templates 118 of the template set 404, for instance, are selected from the collage templates 118 based on attributes of the digital image set 202, such as based on a number of images in the digital image set 202. In an implementation, for example, the template set 404 is selected such that a number of digital frames included in each collage template is equal to a number of images in the digital image set 202.

In this example, the template menu 402 presents the template set 404 sorted into different categories, including landscape templates 406 that present collage template options in a landscape orientation, and portrait templates 408 that present collage template options in a portrait orientation. The template menu 402 also includes custom platform templates 410 for different custom platforms, in this case a Custom Platform A and a Custom Platform B. Generally, the custom platform templates 410 are formatted to conform to preconfigured image formats for platforms that enable users to post and/or share images. Examples of the custom platforms include websites and apps for purposes such as social media, commerce, education, and so forth.

For instance, consider that the Custom Platform A includes collage templates 118 that are preconfigured to conform to an image format specified for a Facebook® cover photo. Thus, a digital collage created using a collage template 118 from the Custom Platform A portion of the template menu 402 can be imported directly into a Facebook® profile as a cover photo without having to transform the digital collage. Other examples of the custom platforms include Instagram®, Twitter®, WhatsApp®, and so forth.

Further to the scenario 400, a user selects the collage template 118a from template menu 402. Alternatively or additionally, the collage template selection module 204 automatically selects the collage template 118a (e.g., independent of user input to select the collage template 118a), such as based on the collage template 118a being identified as a best fit for presenting the digital image set 202. In either case, the collage creation module 110 generates the digital collage 120a using the images from the digital image set 202 and displays the digital collage 120a within the working canvas 302. For instance, the collage creation module 110 takes digital images (e.g., all digital images of the digital image set 202) from the image queue 304, and processes the images based on the collage template 118a to generate the digital collage 120. Example processes for generating the digital collage 120a are described above with reference to FIG. 2, and below with reference to FIGS. 7-13.

Figure 5:
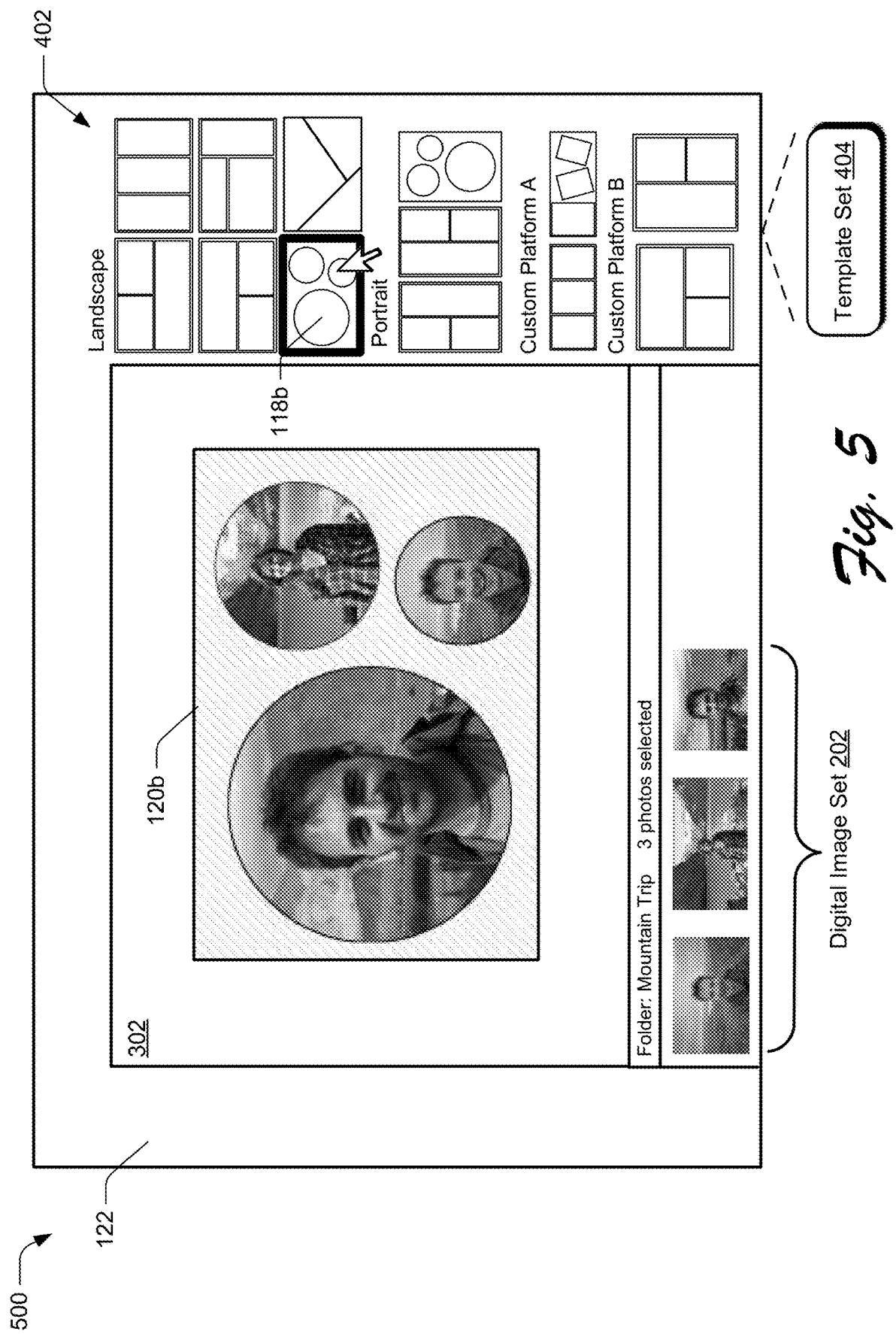
FIG. 5 depicts an example implementation scenario for selecting a different collage template for generating a digital collage.

FIG. 5 depicts an example implementation scenario 500 for selecting a different collage template for generating a digital collage. The scenario 500, for instance, represents a continuation of the scenarios 300, 400, described above. In the scenario 500, a collage template 118b is selected from the template menu 402 (e.g., based on user selection) and is used by the collage creation module 110 to generate a digital collage 120b using the digital image set 202. Notice that in this particular scenario, the arrangement order of the digital image set 202 in the digital collage 120b is different than that utilized in the scenario 400. This reflects the notion that image placement logic utilized by techniques for generating a digital collage using digital images provides a best fit for a set of images into a set of frames for a particular collage template. Thus, the order in which a set of digital images is placed into a set of digital frames may vary between collage templates.

Figure 6:
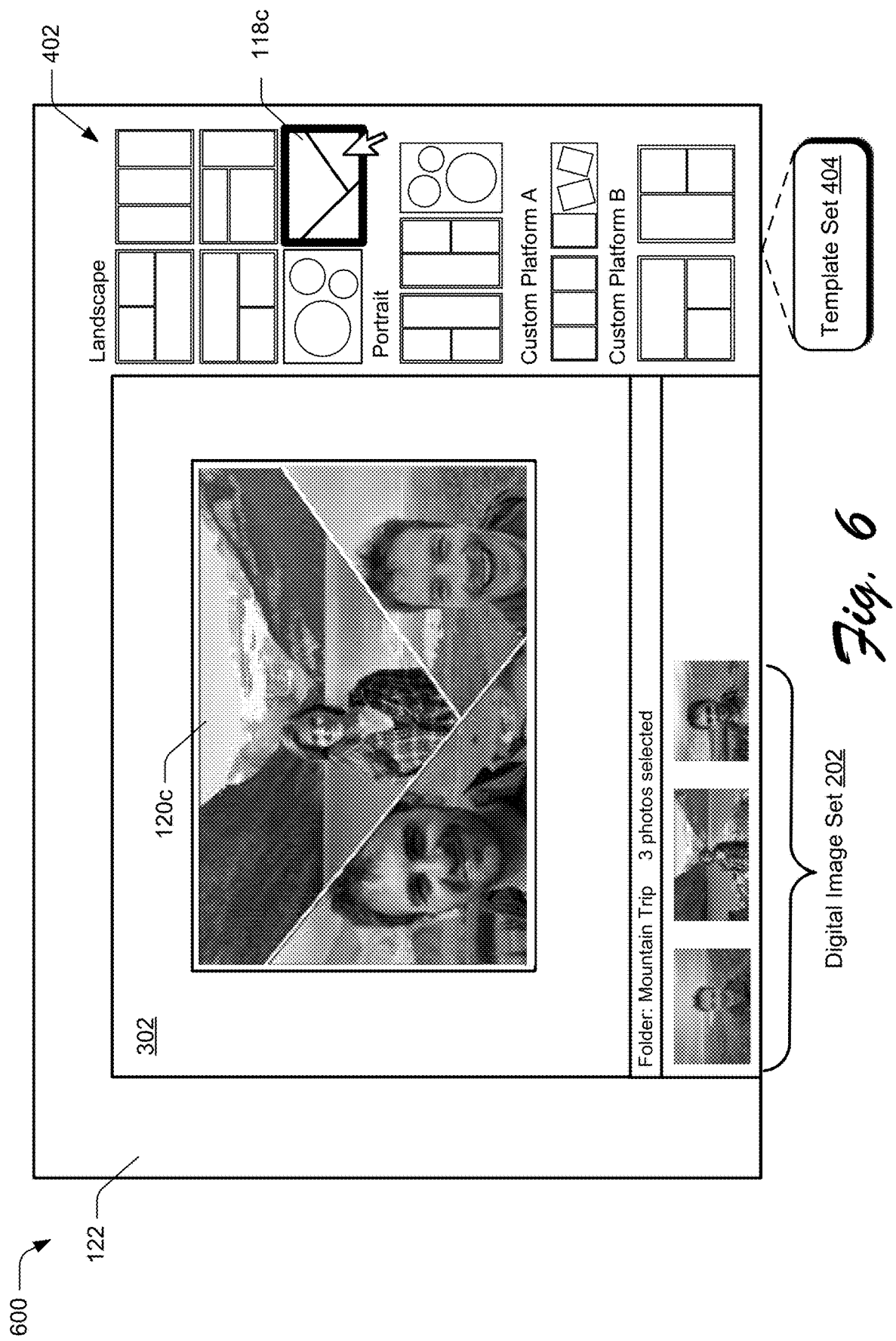
FIG. 6 depicts an example implementation scenario for generating a digital collage using a complex collage template.

FIG. 6 depicts an example implementation scenario 600 for generating a digital collage using a complex collage template. The scenario 600, for instance, represents a continuation of the scenarios 300-500, described above. In this particular scenario, a collage template 118c is selected from the template menu 402 and the collage creation module 110 fits the digital image set 202 into the collage template 118c to generate a digital collage 120c. The collage template 118c includes frames that are non-standard and complex (e.g., non-rectangular) in shape. Thus, techniques for generating a digital collage using digital images are able to accurately fit images into a variety of different layouts and frame shapes while maintaining visual focus on the primary subject matter of the images, i.e., regions of interest identified in the digital images.

FIG. 7 depicts an example procedure 700 for generating a digital collage using digital images. Aspects of the procedures described herein may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the client device 102, the collage service system 104, and/or via cooperation between the client device 102 and the collage service system 104.

Step 702 obtains a set of digital images and a collage template that is usable for generating a digital collage using the set of digital images, the selected collage template including an arrangement of digital frames. The digital images, for example, are obtained in response to user input to select the set of digital images. Generally, the collage template can be selected in various ways. For instance, the collage template selection module 204 can present a set of available collage templates, and a user can select a desired collage template from the set. Alternatively or additionally, the collage template selection module 204 can process a set of available collage templates to identify a collage template that is a best candidate for generating a digital collage with the set of digital images. An example way for identifying a best candidate collage template is described below with reference to FIG. 12. According to various implementations, the digital images are placeable into the arrangement of digital frames to generate the digital collage.

Step 704 generates different arrangement permutations that each represent a different arrangement for placing the set of digital images into the arrangement of digital frames. The permutation calculation module 210, for instance, calculates a number of different ways in which the digital images can be arranged into the digital frames of the collage template.

Step 706 detects a region of interest in each digital image of the set of digital images. For example, the feature recognition module 214 processes each of the digital images to identify a specific region of interest in each digital image. In at least one implementation, a specific type of region of interest is detected in each digital image, such as a human face.

Step 708 assigns a permutation error value for each permutation based on, for each arrangement permutation, fitting the region of interest for each digital image into a respective frame and determining the permutation error value based on the proportions of each digital image that fit into a respective digital frame. A detailed example way for calculating permutation error values is described below with reference to FIG. 11.

Step 710 generates the digital collage by placing the set of digital images into the collage template according to the arrangement permutation with an optimal permutation error value. In an implementation, the arrangement permutation with the optimal permutation error value corresponds to the arrangement permutation with the lowest permutation error value. However, other ways for specifying an optimal permutation error value are considered to be within the scope of the implementations claimed herein.

Figure 8:
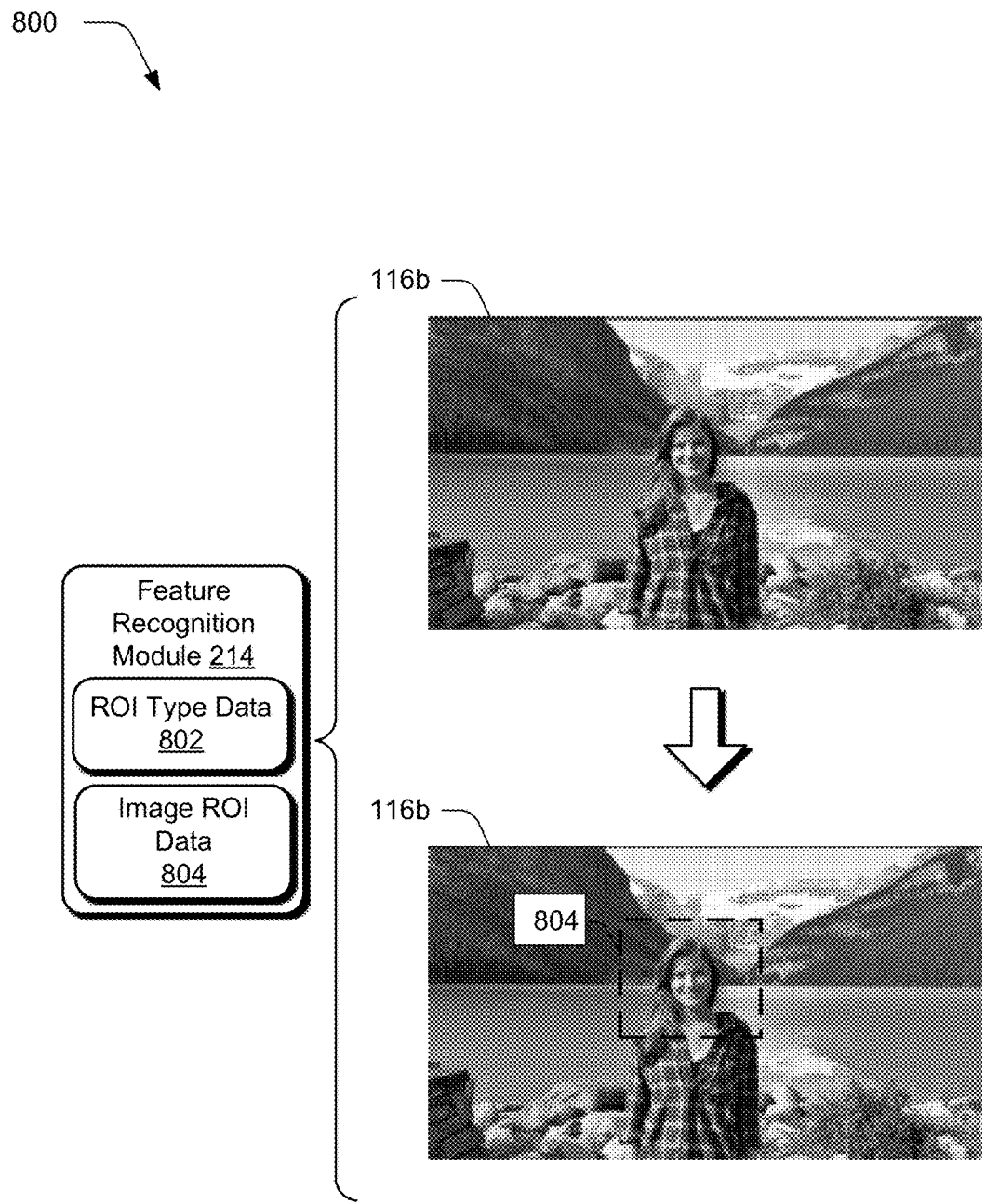
FIG. 8 depicts an example implementation scenario for identifying a region of interest in a digital image.

FIG. 8 depicts an example implementation scenario 800 for identifying a region of interest in a digital image. In the scenario 800, the feature recognition module 214 processes the digital image 116b based on ROI type data 802, which represents data that describes features of a particular region of interest type and/or types. Examples of different ROI types include human faces, natural features (e.g., flowers, trees, and so on), geological features, map features (e.g., architectural features), and so forth. In this particular example, the ROI type data 802 defines various aspects of typical human faces, and is thus usable by the feature recognition module 214 to detect human faces in digital images. However, implementations of the techniques described herein can be employed to detect other types of regions of interest, and to generate digital collages according to the described techniques based on the other types of regions of interest.

Accordingly, the feature recognition module 214 leverages the ROI type data 802 to process the digital image 116b to identify an ROI 804 in the digital image 116b that includes a human face. In an implementation, the area of the ROI 804 is configured to include the entire human face as well as a buffer region of the digital image 116b around the human face. The buffer region, for instance, represents portions of the digital image 116b surrounding the human face but that are not detected to include the human face. Thus, the ROI 804 represents a sub-portion of the digital image 116b to includes a focal point of the digital images 116b and that excludes other portions of the digital image 116b, such as background portions. The feature recognition module 214 stores image ROI data 806 for the ROI 804, which includes various attributes of the ROI 804, such as a position of the ROI 804 on the image 116b (e.g., in pixel coordinates), a size of the ROI 804, an ROI type for the ROI 804, and so forth.

Figure 9:
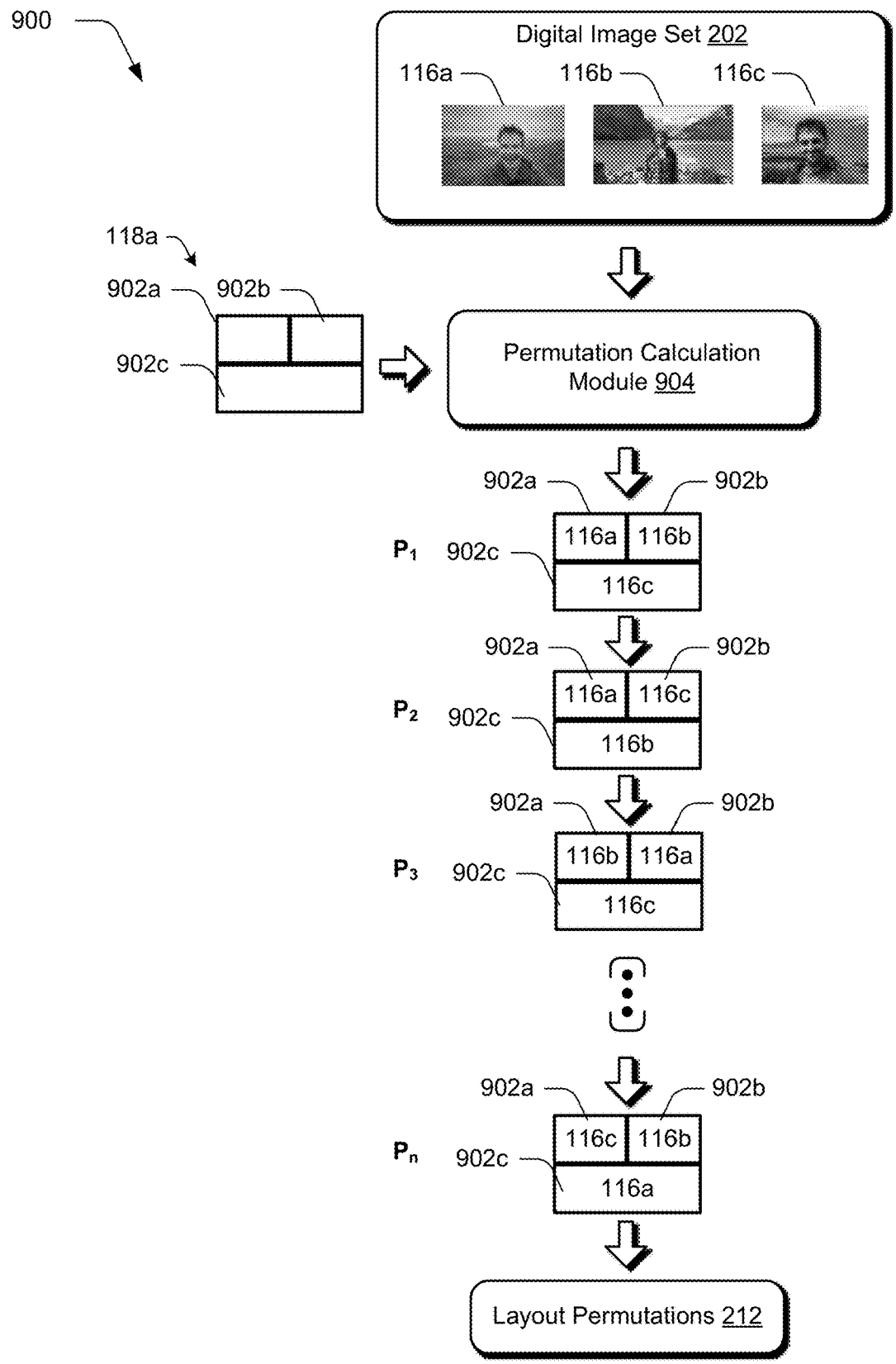
FIG. 9 depicts an example implementation scenario for generating different arrangement permutations for arrangements of digital images within a collage template.

FIG. 9 depicts an example implementation scenario 900 for generating different arrangement permutations for arrangements of digital images within a collage template. The scenario 900, for instance, is performed as part of generating the digital collage 120a described with reference to FIG. 4.

In the scenario 900, the permutation calculation module 210 takes as input the collage template 118a and the digital image set 202. Further, the collage template 118a includes digital frames 902a, 902b, 902c. Accordingly, the permutation calculation module 210 permutes the digital image set 202 over the collage template 118a to generate different arrangement permutations. Generally, the different arrangement permutations represent different ways of fitting the digital images of the digital image set 202 into respective digital frames 902a-902c. In an implementation, the described permutations are generated by placing the digital images 116a-116c into respective digital frames 902a-902c on a one-to-one basis, e.g., only one digital image per frame in a particular permutation. This is not intended to be limiting, however, and the described implementations can be customized to support other scenarios, such as placing multiple images into a single frame, distributing a single image across multiple frames, and so forth.

Continuing, the permutation calculation module 210 generates an arrangement permutation $P_1$ by fitting the digital image 116a into the digital frame 902a, the digital image 116b into the digital frame 902b, and the digital image 116c into the digital frame 902c. Further, the permutation calculation module 210 generates an arrangement permutation $P_2$ by fitting the digital image 116a into the digital frame 902a, the digital image 116c into the digital frame 902b, and the digital image 116b into the digital frame 902c. The permutation calculation module 210 continues this permutation process to generate different arrangement permutations until a permutation $P_n$ is generated, and stores these different permutations as the layout permutations 212. In at least one implementation, n is calculated as: (number of digital images)!

As detailed throughout, the layout permutations 212 are usable to calculate different error values for use in placing digital images in a digital frame, and for selecting a permutation arrangement for arranging digital images in a collage template to generate a digital collage.

Figure 10:
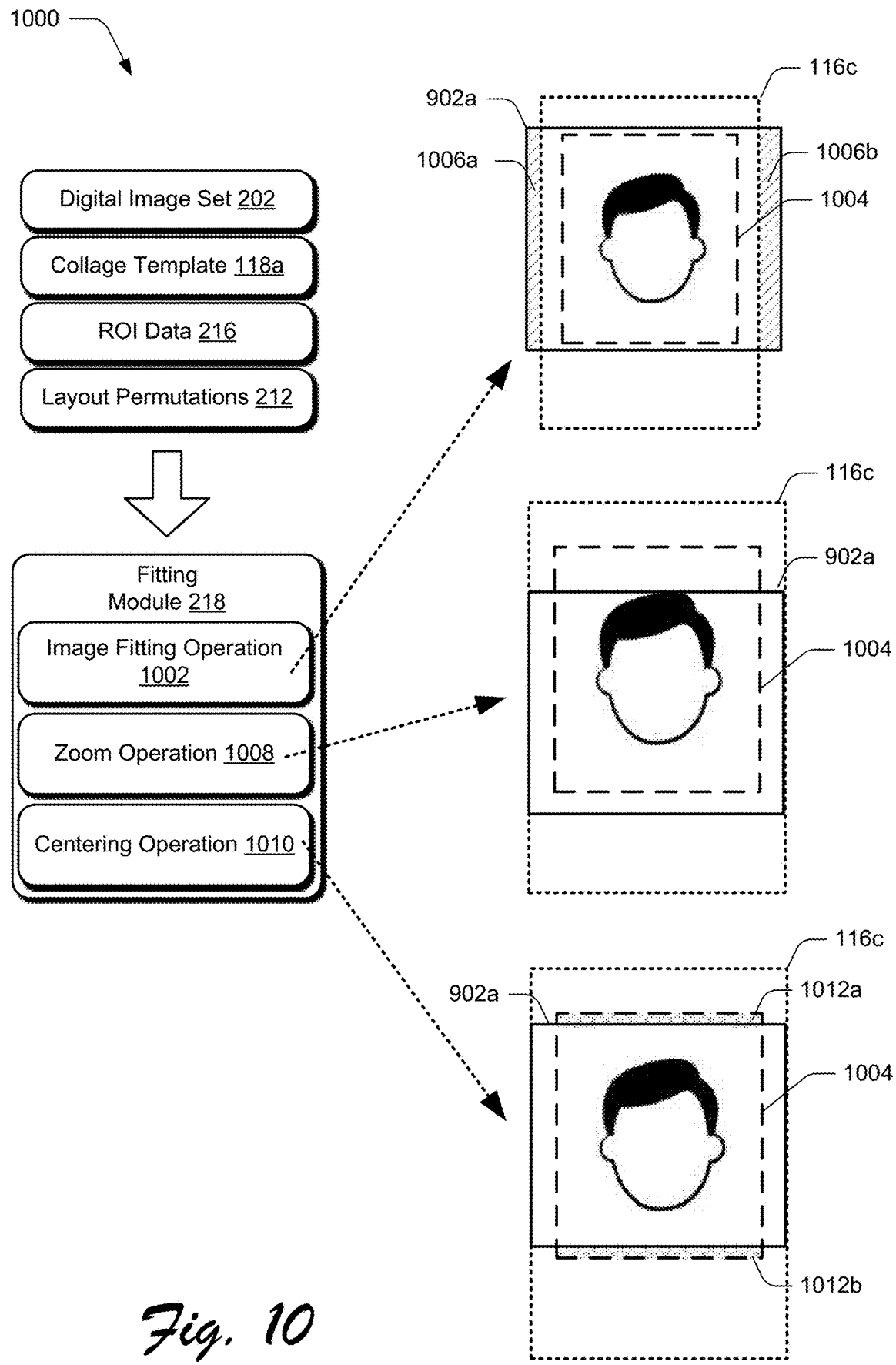
FIG. 10 depicts an implementation scenario for fitting a digital image into a digital frame.

FIG. 10 depicts an implementation scenario 1000 for fitting a digital image into a digital frame. In the scenario 1000, the fitting module 218 takes as input the digital image set 202, the collage template 118a, ROI data 216 for the digital image set 202, and the layout permutations 212 for the collage template 118a. Accordingly, the fitting module 218 proceeds to perform an image fitting operation 1002 for the digital image set 202 to fit the digital images of the digital image set 202 into respective digital frames for each of the layout permutations 212 of the collage template 118a.

As part of the image fitting operation 1002, the fitting module 218 performs an initial fitting of the digital image 116c into the digital frame 902a of the collage template 118a by placing the digital image 116c such that an ROI 1004 of the digital image 116 is centered in the digital frame 902a. For instance, a boundary of the ROI 1004 (indicated by the ROI dashed line) is centered within a boundary of the digital frame 902a. The following is an example equation that can be used to initially scale the digital image 116c to fit within the digital frame 902a, with "frame" referring to the digital frame 902a:

$$scale_{ROI1004} = \min\left(\frac{frame_{width}}{ROI_{width}}, \frac{fram_{height}}{ROI_{height}}\right)$$

With the digital image 116c at its current size, centering the ROI 1004 within the digital frame 902a leaves unfilled regions 1006a, 1006b in the digital frame 902a. The unfilled regions 1006a, 1006b generally represent regions within the digital frame 902a that are not filled by a portion of the digital image 1002. Accordingly, the fitting module 218 detects the unfilled regions 1006a, 1006b and manipulates the digital image 116c to mitigate (e.g., reduce and/or eliminate) the unfilled regions 1006a, 1006b. For instance, proceeding with the scenario 1000, the fitting module performs a zoom operation 1008 on the digital image 116c to enlarge a size of the digital image 116c relative to a size of the digital frame 902a. Notice that the zoom operation 1008 mitigates the unfilled regions 1006a, 1006b within the digital frame 902a such that the unfilled regions 1006a, 1006b are reduced and/or eliminated. That is, most or all of the digital frame 902a is filled with portions of the digital image 116c such that the unfilled regions 1006a, 1006b are not visible.

However, enlarging the digital image 116c causes the ROI 1004 to move away from the center of the digital frame 902a such that the ROI 1004 is no longer centered in the digital frame 902a. Accordingly, the fitting module 218 performs a centering operation 1010 on the digital image 116c to re-center the ROI 1004 within the digital frame 902a. The centering operation 1010, for instance, includes moving the digital image 116c translationally relative to the digital frame 902a, such as by panning and/or scrolling the digital image 116c relative to the digital frame 902a. Accordingly, the ROI 1004 is again positioned as centered relative to the digital frame 902a.

Notice that with the ROI 1004 being resized and re-centered relative to the digital frame 902a, an ROI portion 1012a and an ROI portion 1012b are outside of the digital frame 902a and thus are not displayed within the digital frame 902a. Generally, the portion of the ROI 1004 that fits within the digital frame 902a represents a proportion of the ROI 1004 that fits within the digital frame 902a, e.g., the portion of the ROI 1004 that fits within the digital frame 902a relative to a total area of the ROI 1004. As detailed throughout, this proportion can be used to determine an image error value that indicates a relative quality of the fit of the digital image 116c within the digital frame 902a, and which can also be used to determine a permutation error value for a corresponding arrangement permutation.

For instance, consider that an image error value can be calculated using the following equation:

$$\text{error } score_{(frame_m, image_i)} = 1 - \frac{\text{area of ROI inside frame}}{\text{total area of ROI}}$$

In the scenario 1000, using this equation, the image error score for fitting the digital image 116c within the digital frame 902a can be calculated as:

$$1 - \frac{\text{total area of ROI 1004} - (\text{area of ROI portion 1012a} + \text{area of ROI portion 1012b})}{\text{total area of ROI 1004}}$$

In this way, an image error value can be calculated for fitting digital images into digital frames for each arrangement permutation, and the image error values can be summed to generate permutation error values for each arrangement permutation.

Figure 11:
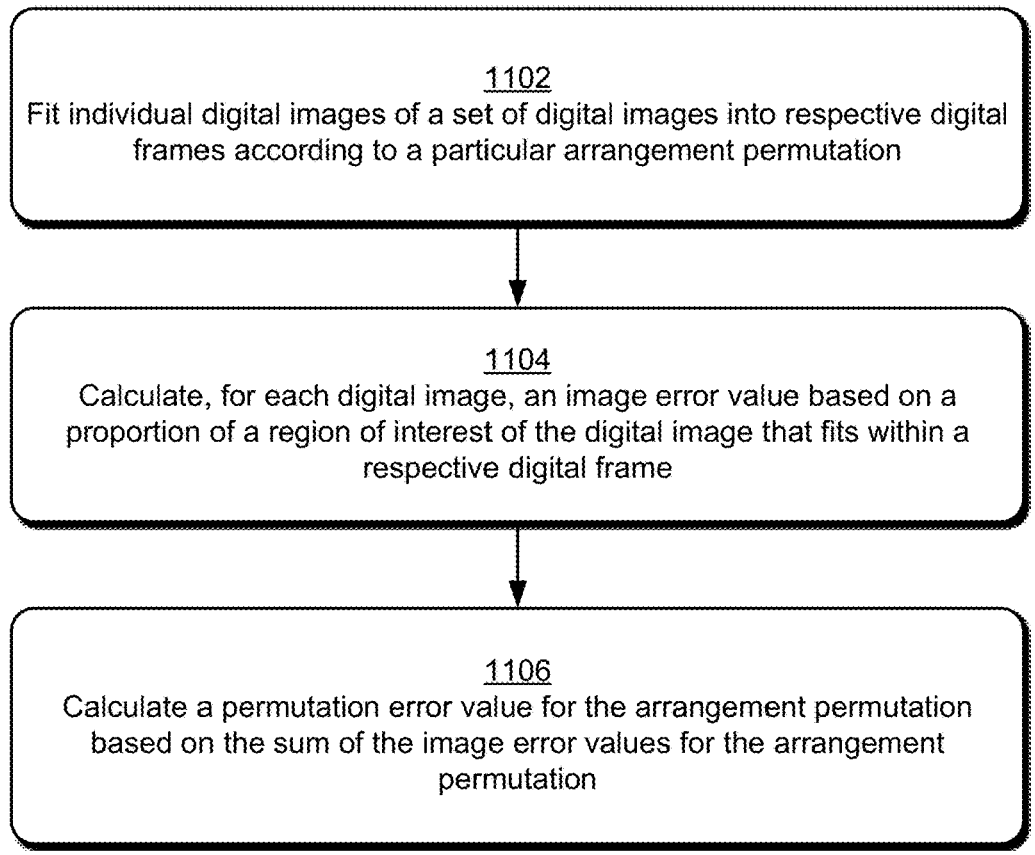
FIG. 11 depicts an example procedure for calculating a permutation error value for an arrangement permutation of a set of digital images in a particular collage template.

FIG. 11 depicts an example procedure 1100 for calculating a permutation error value for an arrangement permutation of a set of digital images in a particular collage template. The procedure, for instance, is performed by the error calculation module 220 as part of generating a digital collage 120. Step 1102 fits individual digital images of a set of digital images into respective digital frames according to a particular arrangement permutation. Example ways of generating different arrangement permutations and digital image fitting are described above with reference to FIGS. 9, 10, respectively.

Step 1104 calculates, for each digital image, an image error value based on a proportion of a region of interest of the digital image that fits within a respective digital frame. The proportion, for instance, represents a percentage of the total area of the region of interest that fits within the respective digital frame. Area of a region of interest can be represented in various ways, such as pixel area, screen area, using a unit of area (e.g., square millimeters, square inches, and so forth), and so on. One example equation for calculating an image error value is presented above in the discussion of FIG. 10. In an implementation, the greater the proportion of a region of interest of a digital image that fits into a digital frame, the lower a corresponding image error value.

Step 1106 calculates a permutation error value for the arrangement permutation based on the sum of the image error values for the arrangement permutation. For instance, the error calculation module 220 sums the image error values for fitting a set of digital images into respective digital frames for the arrangement permutation to generate the permutation error value for the arrangement permutation. In an implementation, a permutation error value $P_e$ can be calculated using the formula:

$$P_e = \sum_{j=1}^{n\_images} \text{image\_error\_value}\left(digital_{frame_j}^{l_i}, digital_{image_{p_j}}\right)$$

Accordingly, the permutation error values for a set of arrangement permutations of a particular collage template 118 can be determined and used to select which arrangement permutation to utilize to generate a digital collage.

Figure 12:
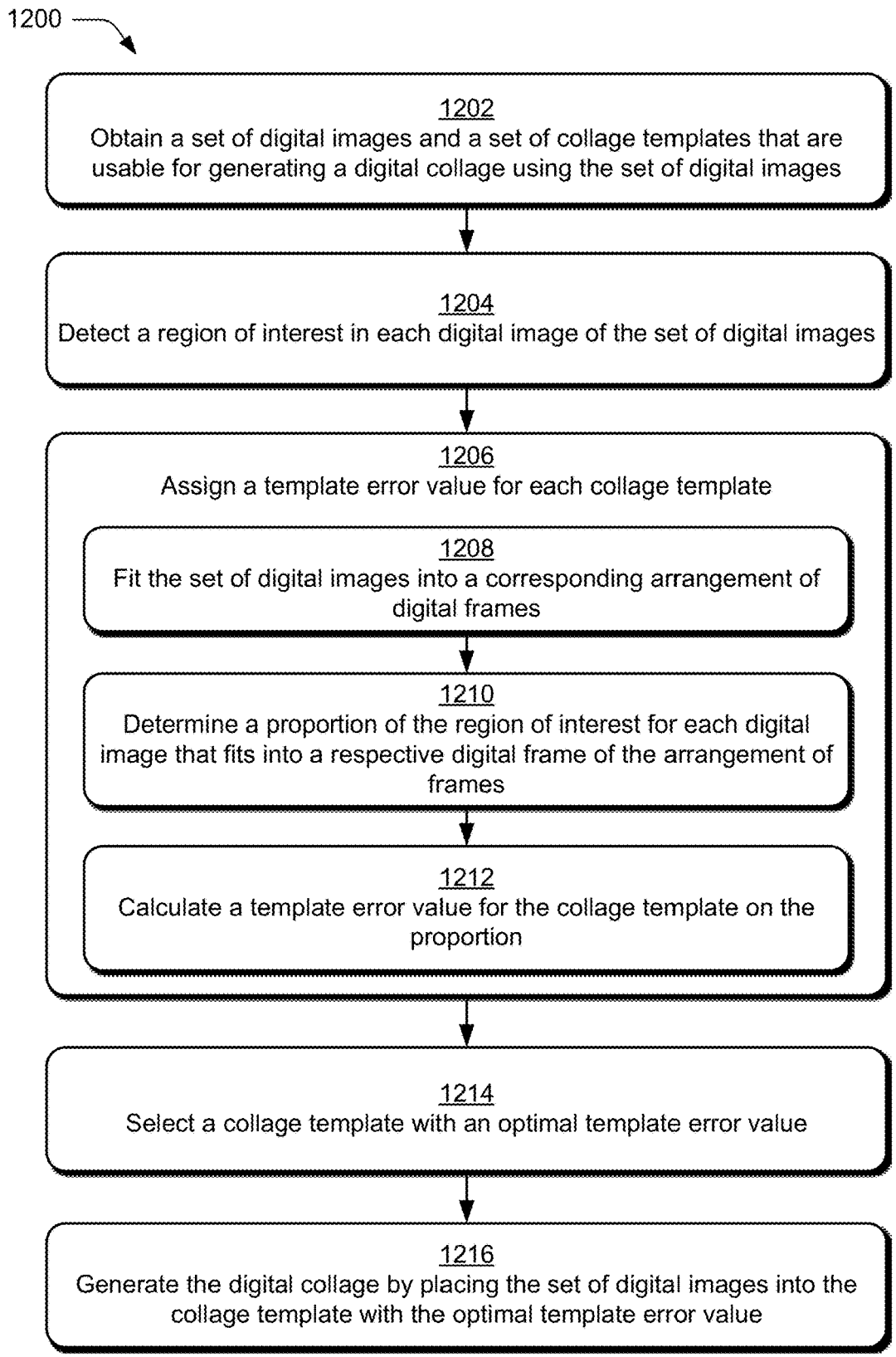
FIG. 12 depicts an example procedure for selecting a collage template for generating a digital collage using a set of digital images.

FIG. 12 depicts an example procedure 1200 for selecting a collage template for generating a digital collage using a set of digital images. The procedure, for instance, is performed by the collage creation module 110 as part of generating a digital collage 120. In an implementation, the procedure 1200 can be performed to select a collage template 118 to use as part of the procedure 700 for generating a digital collage.

Step 1202 obtains a set of digital images and a set of collage templates that are usable for generating a digital collage using the set of digital images. Each collage template, for instance, includes a different respective arrangement of digital frames into which individual digital images of the set of digital images are placeable to generate the digital collage. In an implementation, the set of collage templates are selected based on a number of digital images in the set of digital images. For example, each collage template has a number of digital frames that is equal to the number of digital images.

Step 1204 detects a region of interest in each digital image of the set of digital images. Different ways of detecting a region of interest in a digital images are described above.

Step 1206 assigns a template error value for each collage template by, for each collage template: Fitting the set of digital images into a corresponding arrangement of digital frames (Step 1208); determining a proportion of the region of interest for each digital image that fits into a respective digital frame of the arrangement of frames (Step 1210); and calculating a template error value for the collage template on the proportion (Step 1212). For instance, for each collage template, a number of arrangement permutations can be generated and permutation error values calculated for each permutation, such as described above. Accordingly, for each collage template, a template error value can be calculated based on the permutation error values for the collage template. For instance, the permutation error values can be summed for each collage template to generate the template error value. Alternatively, a lowest permutation error value for each collage template can be assigned as the template error value for the collage template. An example way for calculating permutation error values is discussed above with reference to FIG. 11.

Step 1214 selects a collage template with an optimal template error value. For instance, the collage templates can be sorted based on their respective template error values to identify a collage template with an optimal template error value. In an implementation, the collage template with the optimal template error value corresponds to the collage template with the lowest template error value. However, other ways for specifying an optimal template error value are considered to be within the scope of the implementations claimed herein.

Step 1216 generates the digital collage by placing the set of digital images into the collage template with the optimal template error value. The digital images, for instance, are placed into the collage template based on an arrangement permutation of the collage template that is determined to have an optimal permutation error value, such as a lowest permutation error value. Accordingly, techniques for generating a digital collage using digital images enable optimal selection of collage templates and image arrangements within the collage templates to provide a best fit scenario for a set of digital images.

Figure 13:
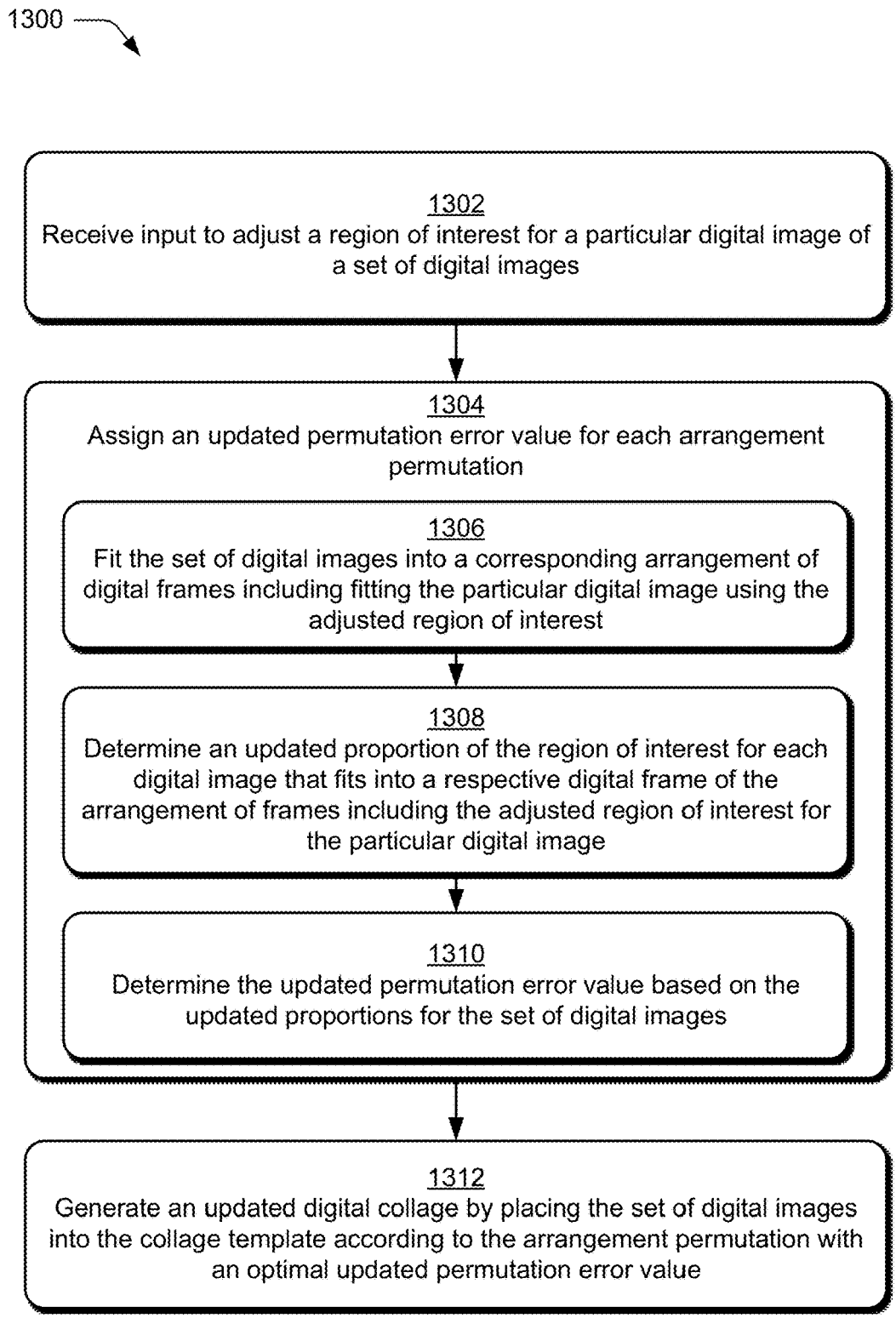
FIG. 13 depicts an example procedure for generating an updated digital collage based on an adjusted region of interest.

FIG. 13 depicts an example procedure 1300 for generating an updated digital collage based on an adjusted region of interest. The procedure 1300, for instance, is performed by the collage creation module 110. In an implementation, the procedure 1300 can be performed in conjunction with the procedure 700, such as an extension of the procedure 700.

Step 1302 receives input to adjust a region of interest for a particular digital image of a set of digital images. A user, for instance, can interact with the image editing application 108 to adjust a region of interest that was previously automatically identified by the feature recognition module 214. The user, for example, can adjust the location and/or the size of the region of interest, such as to include and/or emphasize a different visual feature in the digital image. Alternatively or additionally, a user can provide input to initially identify the region of interest in the particular digital image.

Step 1304 assigns an updated permutation error value for each arrangement permutation by, for each arrangement permutation: Fitting the set of digital images into a corresponding arrangement of digital frames including fitting the particular digital image using the adjusted region of interest (Step 1306); determining an updated proportion of the region of interest for each digital image that fits into a respective digital frame of the arrangement of frames including the adjusted region of interest for the particular digital image (Step 1308); and determining the updated permutation error value based on the updated proportions for the set of digital images (Step 1310). The fitting module 218, for instance, refits the set of digital images into the arrangement of digital frames and using the adjusted region of interest for the particular digital image. The error calculation module 220 then calculates updated permutation error values for each of the arrangement permutations based on the refit digital images.

Step 1312 generates an updated digital collage by placing the set of digital images into the collage template according to the arrangement permutation with an optimal updated permutation error value. The image layout selection module 224, for example, selects the arrangement permutation with the "best" permutation error value, such as the lowest permutation error value. Accordingly, techniques for generating a digital collage using digital images enable dynamic adjustment of a region of interest in a digital image, such as to enable a user to provide input to fine tune a machine-identified region of interest.

Having described example scenarios and procedures in accordance with one or more implementations, consider now an example system and device that can be utilized to implement the various techniques described herein.

Example System and Device

Figure 14:
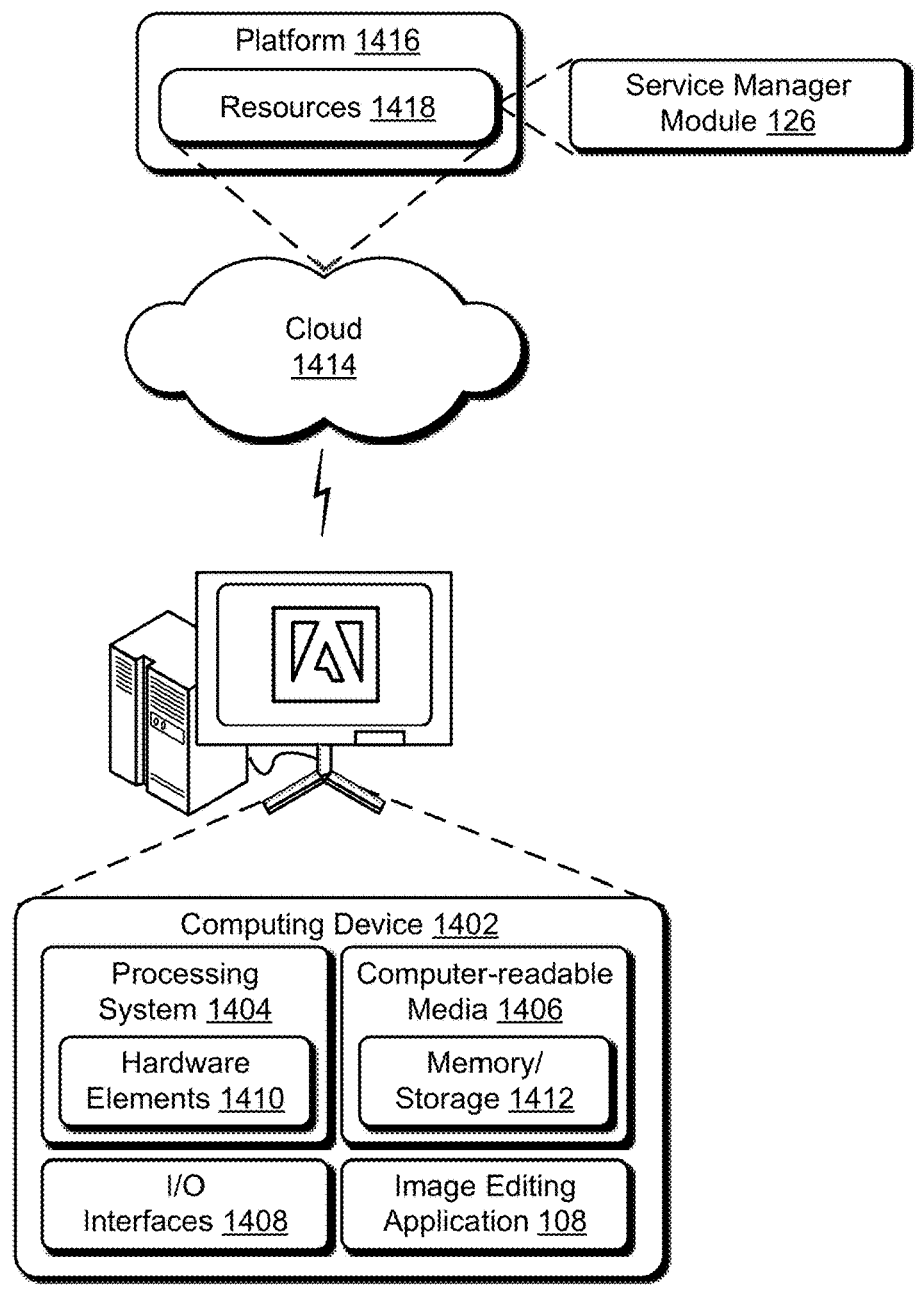
FIG. 14 illustrates an example system including various components of an example device that can be implemented as any type of computing device as described and/or utilized with reference to FIGS. 1-13 to implement embodiments of the techniques described herein.

FIG. 14 illustrates an example system generally at 1400 that includes an example computing device 1402 that is representative of one or more computing systems and/or devices that may implement the various techniques described herein. This is illustrated through inclusion of the image editing application 108 and the service manager module 126. The computing device 1402 may be, for example, a server of a service provider, a device associated with a client (e.g., a client device), an on-chip system, and/or any other suitable computing device or computing system.

The example computing device 1402 as illustrated includes a processing system 1404, one or more computer-readable media 1406, and one or more I/O interfaces 1408 that are communicatively coupled, one to another. Although not shown, the computing device 1402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including hardware elements 1410 that may be configured as processors, functional blocks, and so forth. This may include implementation in hardware as an application specific integrated circuit or other logic device formed using one or more semiconductors. The hardware elements 1410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1406 is illustrated as including memory/storage 1412. The memory/storage 1412 represents memory/storage capacity associated with one or more computer-readable media. The memory/storage component 1412 may include volatile media (such as random access memory (RAM)) and/or nonvolatile media (such as read only memory (ROM), Flash memory, optical disks, magnetic disks, and so forth). The memory/storage component 1412 may include fixed media (e.g., RAM, ROM, a fixed hard drive, and so on) as well as removable media (e.g., Flash memory, a removable hard drive, an optical disc, and so forth). The computer-readable media 1406 may be configured in a variety of other ways as further described below.

Input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1402 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1402. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1410 and computer-readable media 1406 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1410. The computing device 1402 may be configured to implement particular instructions and/or functions corresponding to the software and/or hardware modules. Accordingly, implementation of a module that is executable by the computing device 1402 as software may be achieved at least partially in hardware, e.g., through use of computer-readable storage media and/or hardware elements 1410 of the processing system 1404. The instructions and/or functions may be executable/operable by one or more articles of manufacture (for example, one or more computing devices 1402 and/or processing systems 1404) to implement techniques, modules, and examples described herein.

The techniques described herein may be supported by various configurations of the computing device 1402 and are not limited to the specific examples of the techniques described herein. This functionality may also be implemented all or in part through use of a distributed system, such as over a "cloud" 1414 via a platform 1416 as described below.

The cloud 1414 includes and/or is representative of a platform 1416 for resources 1418. The platform 1416 abstracts underlying functionality of hardware (e.g., servers) and software resources of the cloud 1414. The resources 1418 may include applications and/or data that can be utilized while computer processing is executed on servers that are remote from the computing device 1402. Resources 1418 can also include services provided over the Internet and/or through a subscriber network, such as a cellular or Wi-Fi network.

The platform 1416 may abstract resources and functions to connect the computing device 1402 with other computing devices. The platform 1416 may also serve to abstract scaling of resources to provide a corresponding level of scale to encountered demand for the resources 1418 that are implemented via the platform 1416. Accordingly, in an interconnected device embodiment, implementation of functionality described herein may be distributed throughout the system 1400. For example, the functionality may be implemented in part on the computing device 1402 as well as via the platform 1416 that abstracts the functionality of the cloud 1414.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method performed in a digital medium environment to generate a digital collage using a set of digital images, the method comprising:

obtaining, by at least one computing device, a set of digital images and a set of collage templates that are usable for generating a digital collage using the set of digital images, each collage template including a different respective arrangement of digital frames into which individual digital images of the set of digital images are placeable to generate the digital collage;

detecting, by the at least one computing device, a region of interest in each digital image of the set of digital images;

assigning, by the at least one computing device, a template error value for each collage template by, for each collage template: fitting the set of digital images into a corresponding arrangement of digital frames, determining a proportion of the region of interest for each digital image that fits into a respective digital frame of the arrangement of frames, and calculating a template error value for the collage template on the proportion, wherein calculating a template error value comprises, for each collage template:

determining an image error value for a respective digital image in the digital frame based on the proportion of an area of the region of interest that fits into the digital frame relative to a total area of the region of interest; and processing the image error values for the set of digital images to determine the template error value;

selecting, by the at least one computing device, a collage template with an optimal template error value; and generating, by the at least one computing device, the digital collage by placing the set of digital images into the collage template with the optimal template error value.

2. A method as described in claim 1, wherein said obtaining the set of collage templates comprises selecting, by the at least one computing device, the collage templates based on a number of digital frames in each of the collage templates being equal to a number digital images in the set of digital images.

3. A method as described in claim 1, wherein said detecting the region of interest comprises using, by the at least one computing device, a region of interest algorithm that defines a region of interest type and processes each digital image to identify one or more instances of the region of interest type in each digital image.

4. A method as described in claim 1, wherein said fitting comprises, for each digital image of the set of digital images, manipulating the digital image by performing one or more of resizing the digital image within a respective digital frame or panning the digital image within the respective digital frame, while maintaining the region of interest centered in the respective digital frame.

5. A method as described in claim 1, wherein the proportion of the region of interest for each digital image that fits into a respective digital frame is relative to a total area of the digital image.

6. A method as described in claim 1, wherein said placing the digital images into the collage template comprises:

generating, by the at least one computing device, different arrangement permutations that each represent a different arrangement for placing the set of digital images into an arrangement of digital frames of the collage template;

assigning, by the at least one computing device, a permutation error value for each arrangement permutation by, for each arrangement permutation: fitting the set of digital images into a corresponding arrangement of digital frames, determining a proportion of the region of interest for each digital image that fits into a respective digital frame of the arrangement of frames, and determining the permutation error value based on the proportions for the set of digital images; and generating, by the at least one computing device, the digital collage by placing the set of digital images into the collage template according to the arrangement permutation with an optimal permutation error value.

7. A method as described in claim 1, wherein processing the image error values for the set of digital images comprises summing the image error values to determine the template error value.

8. A system implemented in a digital medium environment to generate a digital collage using a set of digital images, the system comprising:
at least one processor; and
memory having stored thereon computer-readable instructions that are executable by the at least one processor to:
obtain a set of digital images and a set of collage templates that are usable for generating a digital collage using the set of digital images, each collage template including a different respective arrangement of digital frames into which individual digital images of the set of digital images are placeable to generate the digital collage;
detect a region of interest in each digital image of the set of digital images;
assign a template error value for each collage template by, for each collage template, the computer-readable instructions are executable by the at least one processor to: fit the set of digital images into a corresponding arrangement of digital frames, determine a proportion of the region of interest for each digital image that fits into a respective digital frame of the arrangement of frames, and calculate a template error value for the collage template on the proportion, wherein to calculate a template error value comprises, for each collage template, to:
determine an image error value for a respective digital image in the digital frame based on the proportion of an area of the region of interest that fits into the digital frame relative to a total area of the region of interest; and
process the image error values for the set of digital images to determine the template error value;
select a collage template with an optimal template error value; and
generate the digital collage by placing the set of digital images into the collage template with the optimal template error value.

9. A system as described in claim 8, wherein to obtain the set of collage templates comprises to select the collage templates based on a number of digital frames in each of the collage templates being equal to a number digital images in the set of digital images.

10. A system as described in claim 8, wherein to detect the region of interest comprises to use a region of interest algorithm that is operable to define a region of interest type and process each digital image to identify one or more instances of the region of interest type in each digital image.

11. A system as described in claim 8, wherein to fit the set of digital images into a corresponding arrangement of digital frames comprises, for each digital image of the set of digital images, to manipulate the digital image by performing one or more of resizing the digital image within a respective digital frame or panning the digital image within the respective digital frame, while maintaining the region of interest centered in the respective digital frame.

12. A system as described in claim 8, wherein the proportion of the region of interest for each digital image that fits into a respective digital frame is relative to a total area of the digital image.

13. A system as described in claim 8, wherein to place the digital images into the collage template comprises to:
generate different arrangement permutations that each represent a different arrangement for placing the set of digital images into an arrangement of digital frames of the collage template;
assign a permutation error value for each arrangement permutation by, for each arrangement permutation, to: fit the set of digital images into a corresponding arrangement of digital frames, determine a proportion of the region of interest for each digital image that fits into a respective digital frame of the arrangement of frames, and determine the permutation error value based on the proportions for the set of digital images; and
generate the digital collage by placing the set of digital images into the collage template according to the arrangement permutation with an optimal permutation error value.

14. A system as described in claim 8, wherein to process the image error values for the set of digital images comprises to sum the image error values to determine the template error value.

15. A system implemented by at least one computing device in a digital medium environment to generate a digital collage using a set of digital images, the system comprising:
a collage template selection module implemented by the at least one computing device to obtain a set of digital images and a set of collage templates that are usable for generating a digital collage using the set of digital images, each collage template including a different respective arrangement of digital frames into which individual digital images of the set of digital images are placeable to generate the digital collage;
a feature recognition module implemented by the at least one computing device to detect a region of interest in each digital image of the set of digital images;
a fitting module implemented by the at least one computing device to fit, for each collage template, the set of digital images into a corresponding arrangement of digital frames;
an error calculation module implemented by the at least one computing device to determine, for each collage template, a proportion of the region of interest for each digital image that fits into a respective digital frame of the arrangement of frames and calculate a template error value for the collage template based on the proportion, wherein to calculate a template error value comprises, for each collage template, to:
determine an image error value for a respective digital image in the digital frame based on the proportion of an area of the region of interest that fits into the digital frame relative to a total area of the region of interest; and
process, by the at least one computing device, the image error values for the set of digital images to determine the template error value;
an image layout selection module implemented by the at least one computing device to select a collage template with an optimal template error value; and
a collage creation module implemented by the at least one computing device to generate the digital collage by placing the set of digital images into the collage template with the optimal template error value.

16. A system as described in claim 15, wherein to obtain the set of collage templates comprises to implement the collage template selection module to select the collage templates based on a number of digital frames in each of the collage templates being equal to a number digital images in the set of digital images.

17. A system as described in claim 15, wherein to detect the region of interest comprises to implement the feature recognition module to use a region of interest algorithm that is operable to define a region of interest type and process each digital image to identify one or more instances of the region of interest type in each digital image.

18. A system as described in claim 15, wherein to fit the set of digital images into a corresponding arrangement of digital frames comprises, for each digital image of the set of digital images, to implement the fitting module to manipulate the digital image by performing one or more of resizing the digital image within a respective digital frame or panning the digital image within the respective digital frame, while maintaining the region of interest centered in the respective digital frame.

19. A system as described in claim 15, wherein to place the digital images into the collage template comprises to:
   generate, by a permutation calculation module implemented by the at least one computing device, different arrangement permutations that each represent a different arrangement for placing the set of digital images into an arrangement of digital frames of the collage template;
   assign a permutation error value for each arrangement permutation by, for each arrangement permutation, to:
      fit, by a fitting module implemented by the at least one computing device, the set of digital images into a corresponding arrangement of digital frames; determine, by the error calculation module, a proportion of the region of interest for each digital image that fits into a respective digital frame of the arrangement of frames; and determine, by the error calculation module, the permutation error value based on the proportions for the set of digital images; and
   generate, by the collage creation module, the digital collage by placing the set of digital images into the collage template according to the arrangement permutation with an optimal permutation error value.

20. A system as described in claim 15, wherein to process the image error values for the set of digital images comprises to sum the image error values to determine the template error value.

* * * * *